United States Patent
Ramankutty et al.

(10) Patent No.: US 6,917,592 B1
(45) Date of Patent: Jul. 12, 2005

(54) LNS HIGH AVAILABILITY AND LOAD BALANCING WITH LNS-TO-LNS STATE OFFLOADING

(75) Inventors: Rajesh Ramankutty, Schaumburg, IL (US); Shaji Radhakrishnan, Des Plaines, IL (US); Sanil Kumar Puthiyandiyil, Schaumburg, IL (US); Matthew Hayden Harper, Tewksbury, MA (US)

(73) Assignee: 3COM Corporation, Marlborough, MA (US)

( * ) Notice: Subject to any disclaimer, the term of this patent is extended or adjusted under 35 U.S.C. 154(b) by 907 days.

(21) Appl. No.: 09/767,048

(22) Filed: Jan. 22, 2001

(51) Int. Cl.[7] .............................. G01R 31/08; H04J 3/16
(52) U.S. Cl. ........................................ 370/237; 370/468
(58) Field of Search .............................. 370/219, 220, 370/237, 400, 401, 465, 468; 455/453; 379/112.02; 709/164

(56) References Cited

U.S. PATENT DOCUMENTS 6,094,437 A * 7/2000 Loehndorf et al. ......... 370/420
6,366,558 B1 * 4/2002 Howes et al. ............... 370/219
6,816,890 B2 * 11/2004 Noda et al. ................. 709/213

OTHER PUBLICATIONS

Townsley et al., "Layer Two Tunneling Protocol–L2TR", Network Working Gourp, RFC:2661, Aug. 1999, pp. 1–80.

* cited by examiner

Primary Examiner—Chau T. Nguyen
Assistant Examiner—Andrew Wahba
(74) Attorney, Agent, or Firm—McDonnell Boehnen Hulbert & Berghoff LLP (57) ABSTRACT

A primary LNS, a peer LNS and a LAC are coupled to each other via a network A CPE is coupled to the LAC. A first tunnel is established between the CPE and the LAC using the network and information is transmitted through the first tunnel. A determination is made as to whether the primary LNS is overloaded or inoperative. State information is offloaded from the primary LNS to the peer LNS. If the primary LNS is inoperative or overloaded, a second tunnel is established from the CPE to the peer LNS using the state information. Information is transmitted though the second tunnel.

20 Claims, 5 Drawing Sheets

LNS HIGH AVAILABILITY AND LOAD BALANCING WITH LNS-TO-LNS STATE OFFLOADING

FIELD OF THE INVENTION

This present invention relates to a system and method for achieving high availability and load balancing in a network, which uses tunneled connections.

BACKGROUND OF THE INVENTION

Different protocols have been developed to facilitate communications between the devices across different networks. For example, the point-to-point (PPP) protocol may be used for devices to communicate across networks.

In order to establish communications over a point-to-point link, each end of the link may first send packets that help configure the link. After the link has been established, the link can be authenticated before the transmission of packets. The PPP protocol provides a standard method of encapsulating Network Layer protocol information over point-to-point links. The PPP protocol encapsulates data over data link connections; establishes, configures, and tests the data link connection; and establishes and configures different network-layer protocols PPP is tunneled using the L2TP protocol. The L2TP protocol is a protocol established by the Internet Engineering Task Force (IETF). User devices, for example, computers, may be coupled to a L2TP Access Concentrator (LAC). The LAC is coupled to a network, for example, the Internet. The LAC may be coupled to other networks, as well. The network may be coupled to a L2TP Network Server (LNS). The LNS may be coupled to other types of network, or devices, as well.

A tunnel comprises a communication path between a LNS-LAC pair and may, for example, carry PPP datagrams between the LAC and the LNS In addition, multiple sessions may be multiplexed over a single tunnel. A control connection operating in-band over the same tunnel controls the establishment, release, and maintenance of sessions and of the tunnel itself.

Control messages,-for example, in a L2TP packet format, may be sent over a tunnel between a LNS and a LAC. To maximize extensibility while still permitting interoperability, a uniform method for encoding message types and bodies may be used. This encoding may be, for example, in the Attribute-Value Pair (AVP) format. Other types of formats are possible Control messages may be used to establish and clear user sessions. For example, control messages are used to maintain the control connection itself. The control connection is initiated by an LAC or LNS after establishing the underlying tunnel-over-media connection.

Control messages may be sent as packets on the established tunnel connection between a given LNS-LAC pair. All data is sent in network order (high order octets first). Each control message may have a header, for example, including an AVP indicating the type of control message, followed by one or more AVPs appropriate for the given type of control message. The control messages may have other fields and use other formats, as well.

Various types of control messages are sent between the LAC and the LNS. For instance, the Start-Control-Connection-Request (SCCRQ) is an L2TP control message and may be used to initialize the tunnel between an LNS and an LAC. The tunnel must be initialized through the exchange of these control messages before any other L2TP messages can be issued. The establishment of the control connection is started by the initiator of the underlying tunnel. control message sent between the LNS and the LAC is the Start-Control-Reply (SCCRP). The SCCRP message is an L2TP control message sent in reply to a received Start-Control-Connection-Request message. Sending this message indicates that the request was successful.

SUMMARY OF THE INVENTION

The present invention relates to providing high availability and load balancing in a network that uses tunneled connections.

In one embodiment of the present invention, a customer premise equipment (CPE) is coupled to a LAC. The LAC is coupled to a first network. The first network is coupled to a primary LNS. The first network is also coupled to a peer LNS. The primary LNS and the peer LNS are also coupled to second and third networks. The first, second, and third networks may be the same or different networks. The second and third networks may be connected to user devices.

The primary LNS offloads state information concerning the tunnels and/or sessions to the peer LNS. The peer LNS acts as a backup or standby LNS. The primary LNS updates its state information to the peer LNS periodically. It will also offload the state information whenever there is a change in the state information. The information is sufficient to make an automatic and transparent switchover from the primary LNS to the peer LNS. For example, the state information may include negotiated and required Link Control Protocol (LCP) parameters, negotiated and required authentication parameters, negotiated and required Network Control Protocol (NCP) parameters, and the configuration of the primary LNS. Other types of state information is possible. The offloading may occur directly between the primary LNS and the peer LNS via the first network. However, the offloading may occur along other paths from the primary LNS to the peer LNS, as well.

The primary LNS may make a request to the LAC that a switchover is to occur from the primary LNS to a peer LNS. For example, the switchover may be requested when the primary LNS is heavily loaded. In addition, the switchover may also be requested when the primary LNS becomes inoperative or the connectivity between the primary LNS and the LAC goes down. The LAC detects these events when it detects that it can no longer communicate with the primary LNS. The LAC may buffer data sent from the CPE until the switchover is complete.

After the switchover occurs, data that has been buffered is sent to the peer LNS. From the second LNS, the data is sent to its destination. Also, additional data from the CPE is sent from the CPE to the second LNS via a tunnel via the first network In another embodiment of the present invention, the LNS state is offloaded using request and reply messages. The request may be sent from the primary LNS to the peer LNS and the reply granting the request may be sent from the peer LNS to the primary LNS.

These as well as other features and advantages of the present invention will become apparent to those of ordinary skill in the art by reading the following detailed description, with appropriate reference to the accompanying drawings.

BRIEF DESCRIPTION OF THE DRAWINGS

Preferred embodiments of the present inventions are described with reference to the following drawings, wherein.

DETAILED DESCRIPTION OF PREFERRED EMBODIMENT

Figure 1:
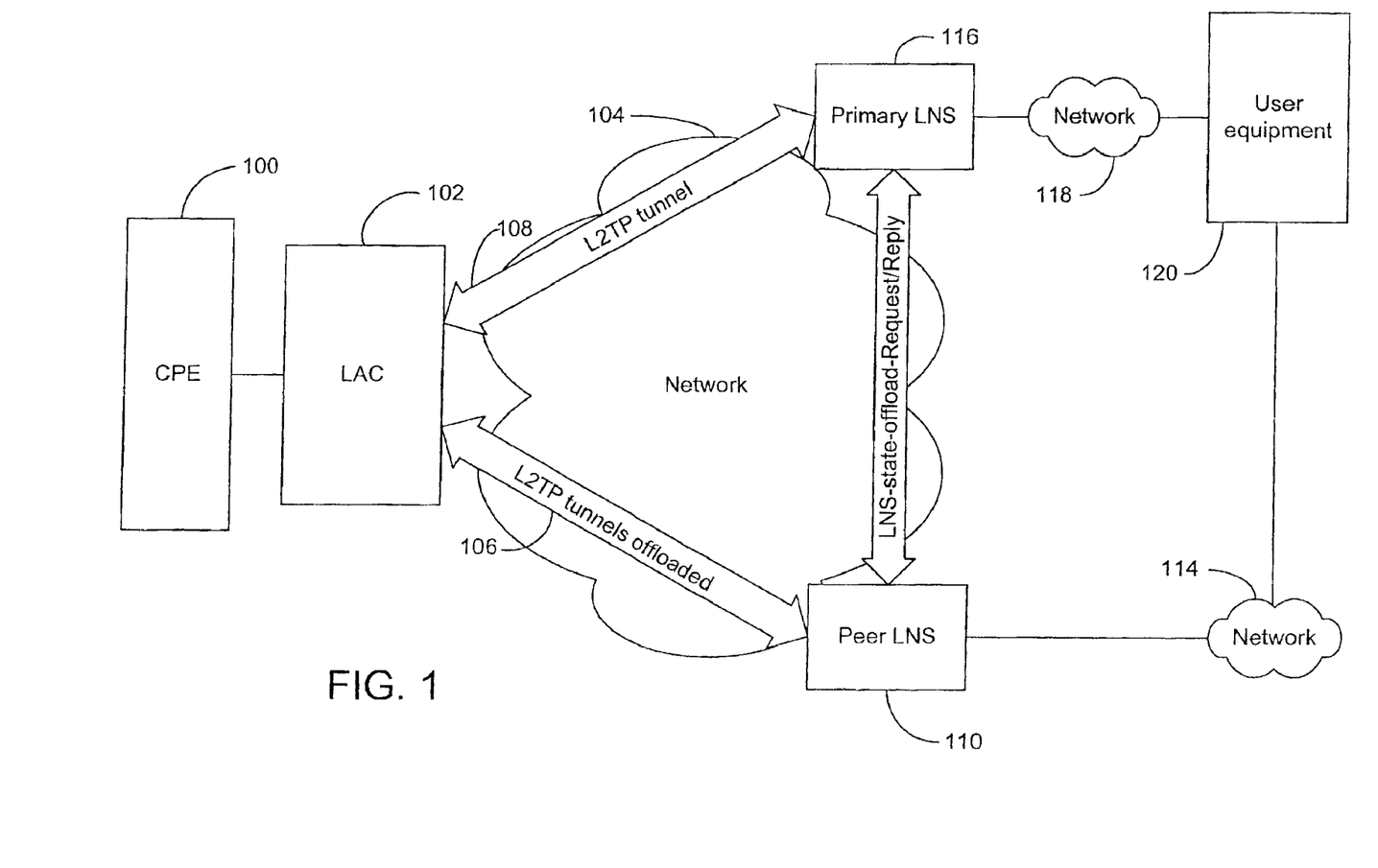
FIG. 1 is a diagram illustrating a system in accordance with a preferred embodiment of the present invention.

Referring now to FIG. 1., customer premise equipment (CPE) 100 is coupled to ail L2TP local access concentrator (LAC) 102. The LAC 102 is coupled to a network 104. The network 104 is coupled to a peer L2TP network server (LNS) 110 and a primary LNS 116. The LNS 110 includes a primary LNS state store 112. The LNS 116 is coupled to a network 118. The network 118 is coupled to user equipment 120. The LNS 110 is coupled to a network 114. The network 114 is coupled to user equipment 120.

The CPE 100 can be any type of device that a user maintains to both transmit and receive any type of information. It may be a computer, data entry device, or telephone, for example. The CPE may be other types of devices, as well.

The LAC 102 is attached to the network 104 and may implement the L2TP protocol. The LAC 102 may also implement the media over which L2TP is to operate and pass traffic from the CPE 100 to the LNSs 114 or 118. The LAC 102 may be the initiator of incoming calls from the network 104 and the receiver of outgoing calls to the network 104. The LAC may perform other functions, as well. In addition, the LAC may be any type of access concentrator that implements any type of protocol.

A tunnel 108 is maintained between the LAC 102 and the LNS 108. A tunnel 106 is also maintained between the LAC 102 and the LNS 112. A tunnel is also maintained between the LNS 116 and the LNS 110.

The network 104 may be any type of network that can transport any type of information. For example, it may be an IP network, the Internet, the public switched telephone network (PSTN) or a wireless network. In addition, the network 104 may be any combination of any number of networks. Other types of networks are also possible.

The LNS 110 and the LNS 116 are any type of network server capable of point-to-point protocol (PPP) termination. The LNS 110 or the LNS 116 may have a plurality of interfaces to provide communication with a variety of networks, for example, LAN interfaces or WAN interfaces. The LNS 110 and the LNS 116 may be the initiator of outgoing calls LO the network 104 and the receiver of incoming calls from the network 104.

The LNS 116 transmits information between the LAC 102 and the network 118 The LNS 110 is used as the peer (or secondary) LNS when a switchover between the LNS 116 and the LNS 110 occurs. In other words, the LNS 110 is inactive until a switchover occurs.

The networks 114 and 118 may be any type of network used to transmit any type of information. For example, they may be IP networks, the Internet, a PSTN, or a wireless network They may also be local area networks (LANs) or wide area networks (WANs) or have any other type of configuration. In addition, the networks 114 and 118 may be combinations of networks. Finally, the networks 114 and 118 may be the same network or the networks 114 and 118 may be the same network as the network 104.

The user equipment 120 may be any type of device that is used to transmit and/or receive any type of information. For example, the user equipment 120 may be telephone, a wireless device, or a computer. Other types of user equipment is possible.

The LNS 110, LNS 116, and LAC 102 maintain states for each user and each session that is attached to the LAC 102. A session is created when an end-to-end PPP connection is attempted between the CPE 100 and the LNS 114 or LNS 118, or when an outbound call is initiated. A tunnel may contain a plurality of sessions. In one example of the communications sent between the LAC 102 and the LNSs 110 and 116, datagrams related to a session are sent over the tunnel between the LAC 102 and LNS 110 or LNS 116.

The tunnel 108 may be a L2TP tunnel that carries information between the LAC 102 and the LNS 116. For example, the tunnel 108 may carry control messages. The tunnel 106 may also offload information from the LNS 116 to the LNS 112 via the network 104 and the LAC 102. The tunnel 124 may carry control messages between the LNS 116 and the LNS 110 The tunnel 108 may include a single session or multiple sessions.

The LAC 102 may request that a connection be established between the LAC 102 and the LNS 116, for example, using a SCCRQ message. In reply, the LNS may grant the request, for example, using a SCCRP message. Included in the reply from the LNS is the address of the LNS 110. For example, the LNS 116 may send a new AVP (with the reply) containing the IP address of the LNS 110. The address of the LNS 110 informs the LAC 102 of the availability of a LNS 110, which can be used to achieve high availability and/or load balancing.

The AVP is an example of one mechanism whereby the primary LNS 116 informs the LAC 102 about the address of the LNS 110. Alternatively, the LNS may communicate address information using other messages with other formats.

The state information concerning the LNS 116 may be downloaded from the LNS 116 to the LNS 110. For example, the state information may contain LCP negotiated parameters. NCP negotiated parameters, and L2TP configuration information. The state information may contain other parameters, as well.

In operation, the LNS 116 may become heavily loaded. For example, the LNS may be configured with a threshold. The threshold indicates the maximum number of connections in an LNS. If the total number of L2TP connections exceeds the threshold, the LNS is considered heavily loaded. The LNS may also monitor memory usage and CPU usage. If the memory usage and CPU usage exceed certain thresholds, then the LNS may be considered heavily loaded.

When the LNS becomes heavily loaded, the LNS 116 sends a request to the LAC 102 to switch over the LNS 116.

For example, the switchover request may be in the form or an STPLRQ command. The LAC then may accept the request. For example, the reply may be in SCCRP command. After the request has been accepted, a tunnel may be formed between the LAC 102 and the LNS 110. Data may then be transmitted between the LAC 102 and the LNS 110.

The LNS 116 may also become inoperative. In this case, the data packets sent from the CPE are buffered in the LAC 102 and a tunnel is formed between the LAC 102 and the LNS 110 Data can then flow between the LAC 102 and the LNS 110.

Figure 2:
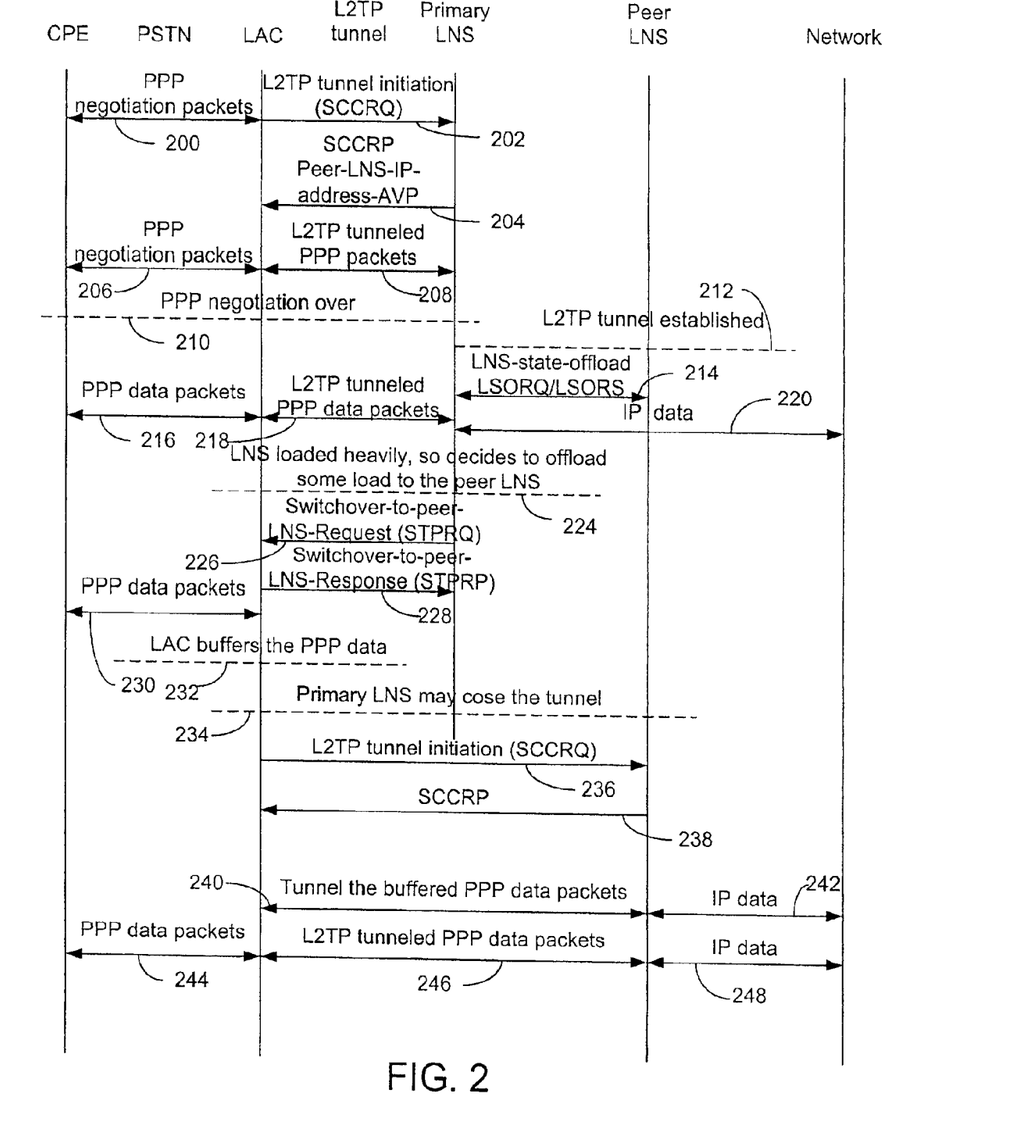
FIG. 2 is a call-flow diagram in accordance with a preferred embodiment of the present invention.

Referring now to FIG. 2, a call flow diagram illustrating aspects of the present invention 15 is described. At step 200, PPP negotiation packets may be passed between the CPE and the LAC. The negotiation packets may be exchanged between the CPE and the LAC and are used to negotiate variables that affect the connection between the CPE and the LAC. These variables, for instance, may relate to frame size, network-level addresses, compression methods and authentication. The variables may relate to other types of parameters, as well. At step 202, a connection request message, for example, a start-control-correction-request (SCCRQ) message, may be sent from the LAC to the primary LNS. The connection request message may be any control message used to initialize the tunnel between the primary LNS and the LAC At step 204, a connection reply message, for example, a start-control-connection-reply (SCCRP) message, may be sent in reply to the connection request message. The message indicates that the connection request was granted. At step 206, PPP negotiation packets may be again exchanged between the CPE and the LAC. At step 208, data packets may be transmitted from the LAC to the primary LNS through a tunnel, for example, an L2TP tunnel.

At step 210, the negotiation between the LAC and the primary LNS is completed In other words, the exchange of negotiation packets is concluded. At step 212, a tunnel, for example an L2TP tunnel, is established between the primary LNS and the peer LNS The peer LNS is a backup LNS. So, the tunnel between the primary LNS and the peer LNS is to offload the information regarding the L2TP tunnel between the primary LNS and the LAC. The information will be used to switch all the tunnels between the primary LNS and LAC to the peer LNS and LAC.

At step 214, an LNS-state-offload-request (LSORQ) message may be sent from the peer LNS to the primary LNS and a LNS-state-offload-reply (LSORS) message granting the request may be sent from the primary LNS to the peer LNS. Respectively, the messages indicate that the primary LNS desires to off-load state information from the primary LNS to the peer LNS, and the peer LNS has granted the request.

At step 216, data packets, for example, PPP data packets, may be sent between the CPE to the LAC. Alternatively, other formats may be used. At step 218, the data packets may be tunneled between the LAC and the primary LNS. The LNS converts the packets into a format that is suitable for transport over a network. For example, the data packets may be connected into IP data packets. At step 220, IP data packets may be transmitted between the primary LNS and the network.

At step 224, the primary LNS becomes heavily loaded. For example, the LNS may be configured with a threshold. The threshold indicates the maximum number of connections in an LNS. If the total number of L2TO connections exceeds the threshold, the LNS is considered heavily loaded. The LNS may also monitor memory usage and CPU usage.

If the memory usage and CPU usage exceed certain thresholds, then the LNS may be considered heavily loaded The primary LNS then determines that it will offload some of the load that it is carrying to the peer LNS.

At step 226, the primary LNS sends a request to switchover to a peer LNS, for example, a switchover-to-peer-LNS-request (STPLRQ), to the LAC. The request will contain information such as the IP address of the peer LNS and the type of switch-over. At step 228, the LAC grants the request and issues a reply, for example, using a switchover-to-peer-LNS response (STPLRP). At step 230, data packets, for example, PPP data packets, are sent from the CPE to the LAC. At step 232, the LAC buffers the data packets. At step 234, the primary LNS may close the tunnel between itself and the network.

At step 236, a connection request message, for example, a SCCRQ message, may be sent from the LAC to the peer LNS. At step 238, a reply message granting the request, for example, a SCCRP message, may be sent from the peer LNS to the LAC. At step 240, the tunnel may be established and the buffered data packets may be transmitted from the LAC to the peer LNS. The data packets may be transformed into a format compatible with transmission over the network. For example, the packets may be transformed from a PPP format to a IP data format At step 242, PPP data may be sent from the peer LNS to the network.

At step 244, PPP data packets may be transmitted from the CPE to the LAC. At step 246, the PPP data packets may be tunneled from the LAC to the peer LNS. AT step 248, IP data may be transmitted from the peer LNS to the network.

Figure 3:
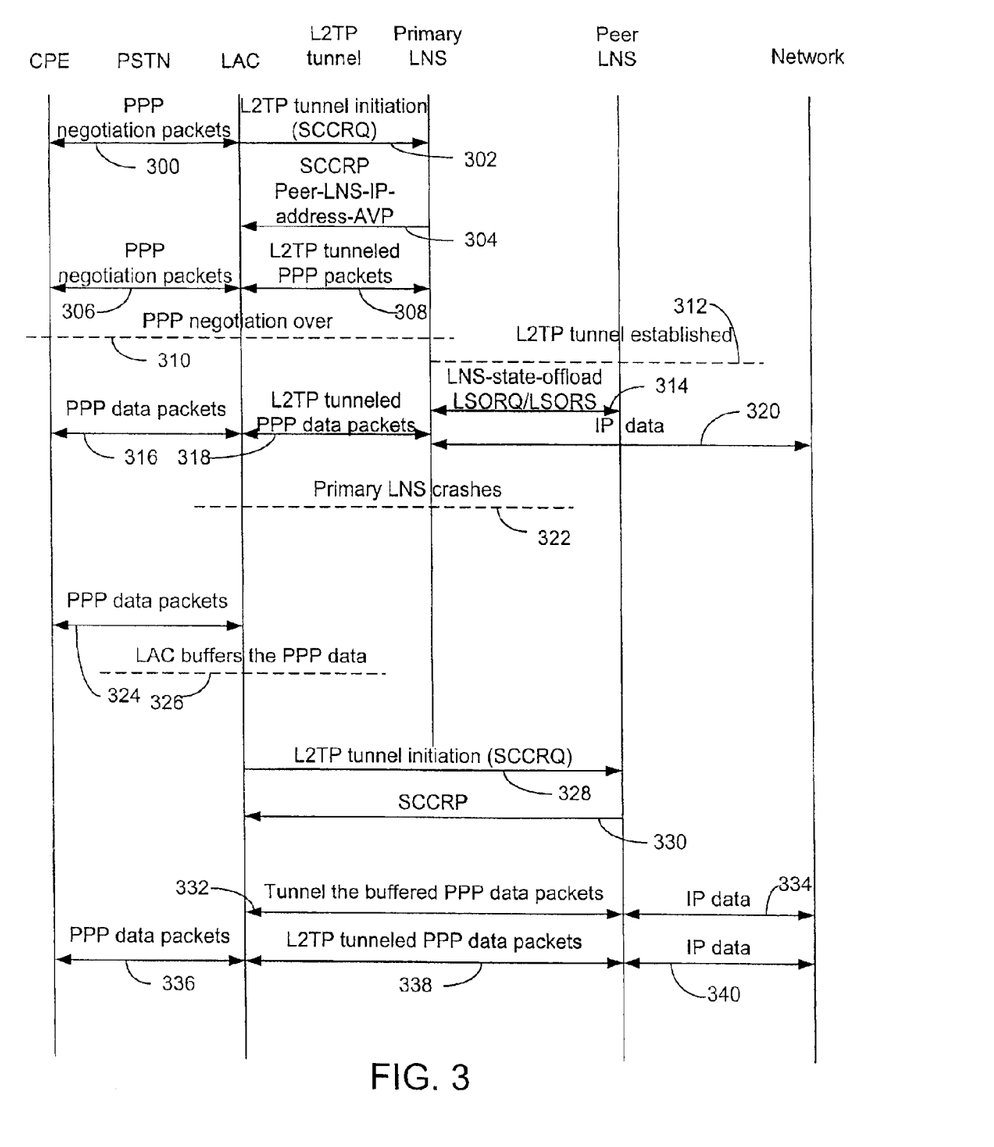
FIG. 3 is a call-flow diagram in accordance with a preferred embodiment of the present invention.

Referring now to FIG. 3, a call flow diagram illustrating aspects of the present invention is described. At step 300, PPP negotiation packets may be passed between the CPE and the LAC The negotiation packets may be exchanged between the CPE and the LAC and are used to negotiate variables that affect the connection between the CPE and the LAC. These variables, for instance, relate to frame size, network-level addresses, compression methods, and authentication. The variables may relate to other types of parameters, as well. At step 302, a connection request message, for example, a start-control-connection-request (SCCRQ) message, may be sent from the LAC to the primary LNS. The connection request message may be any control message used to initialize the tunnel between the primary LNS and the LAC.

At step 304, a connection reply message, for example, a start-control-connection-reply (SCCRP) message, may be sent in reply to the connection request message. The message indicates that the connection request was granted. At step 306, PPP negotiation packets may be again exchanged between the CPE and the LAC. At step 308, data packets are transmitted from the LAC to the primary LNS through a tunnel, for example, an L2TP tunnel.

At step 310, the negotiation between the LAC and the primary LNS is completed in other words, the exchange of negotiation packets is concluded. At step 312 a tunnel is established between the primary LNS and the peer LNS.

At step 314, state off-load request and state off-load reply messages, for example. LSORQ and LSORS messages, may be exchanged between the primary LNS and the peer LNS Respectively, the messages indicate that the primary LNS desires to off-load state information from the primary LNS to the peer LNS, and the peer LNS has granted the request.

At step 316, data packets, for example, PPP data packets, may be sent between the CPE to the LAC. Alternatively, other forms of packets may be used. At step 318, the data packets may be tunneled between the LAC and the primary LNS. The LNS converts the packets into a format that is suitable for transport over a network. For example, the data packets may he converted into IP data packets. At step 320, IP data packets are transmitted between the primary LNS and the network.

At step 322, the primary LNS becomes inoperative. For example, the LAC may detect a lack of acknowledgement for L2TP control packets sent from the LAC to the primary LNS The primary LNS may become inoperative due to any reason, for example, equipment failure At step 326, the LAC may buffer the data packets.

At step 328, a connection request message, for example, a SCCRQ message, may be sent from the LAC to the peer LNS. At step 330, a reply message granting the request, for example, a SCCRP message, may be sent from the peer LNS to the LAC.

At step 332, the tunnel is established and the buffered data packets are transmitted from the LAC to the peer LNS. The data packets are transformed into a format compatible with transmission over the network. For example, the packets may be transformed from a PPP format to a IP data format. At step 334, IP data may be sent from the peer LNS to the network.

At step 336, PPP data packets are transmitted from the CPE to the LAC. At step 338, the PPP data packets may be tunneled from the LAC to the peer LNS. At step 340. IP data may be transmitted from the peer LNS to the network.

Figure 4:
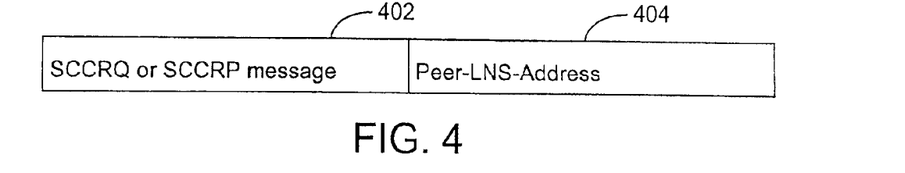
FIG. 4 is method and device for informing an access concentrator of an address of a peer network server in accordance with a preferred embodiment of the present invention.

Referring now to FIG. 4, a preferred device and method for informing the LAC of a peer LNS is described. A first field 402 contains the SCCRQ or SCCRP message. A second field 404 contains the address of the peer LNS address. In one example, the address in a four byte IP address.

Figure 5A:
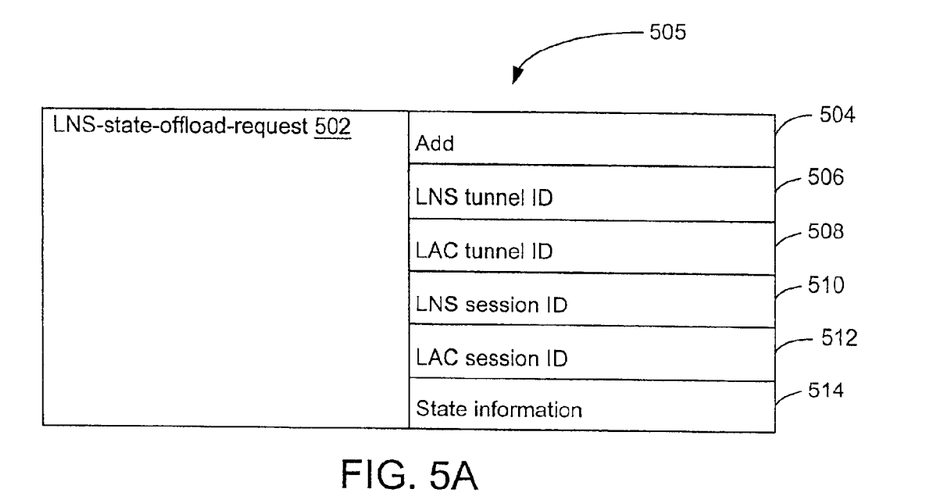
FIG. 5a is a device and method for offloading state information in accordance with a preferred embodiment of the present invention.

Referring now to FIG. 5a, one embodiment of the LSORQ message 502 is described An LNS-state-offload-request field 502 includes information to identify the nature of the request and other information. For example, this field may include an opcode indicating that the message is an LSORQ message. A field 504 indicates that the connection should be added. An AVP field 505 comprises information sufficient to identify a tunnel from the LAC to a LNS. An LNS tunnel id field 506 contains the identity of the tunnel, as seen by the LNS. An LAC tunnel id field 508 contains the identity of the LAC tunnel, as seen from the LAC. An LNS session number field 510 contains the session number of session on the tunnel, as seen from the LNS. A LAC session id field 512 contains the session number of the session, as seen from the LAC A state information field 514 contains data indicating the state of the L2TP session to be downloaded to the peer LNS. The above fields may be integer values. However other types of values are possible.

Figure 5B:
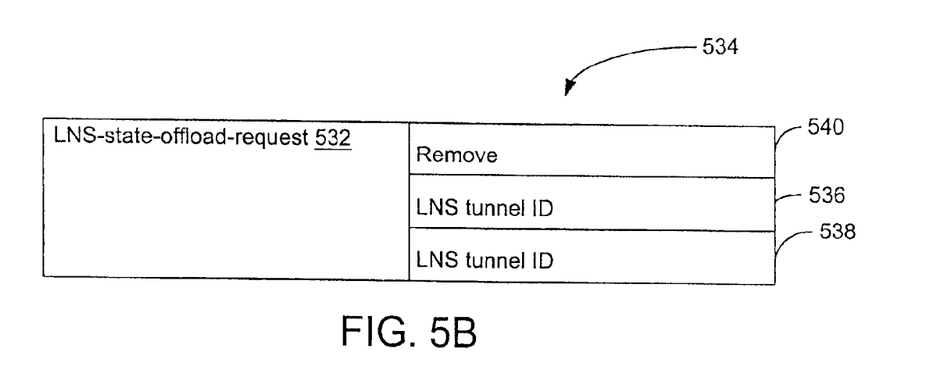
FIG. 5b is a device and method for offloading state information in accordance with a preferred embodiment of the present invention.

Referring now to FIG. 5b, an alternate embodiment of the LSORQ message is described. An LNS-state-offload-request field 532 includes information to identify the nature of the request and other information. For example, this field may include an opcode indicating that the message is an LSORQ message. An AVP field 534 comprises information sufficient to identify a tunnel from the LAC to a LNS. A field 540 indicates that a connection should be removed. An LNS tunnel id field 536 contains the identity of the tunnel, as seen by the LNS. An LNS session number field 538 contains the session number of session on the tunnel, as seen from the LNS. The above fields may be integer values. However, other types of values are possible.

Figure 6:
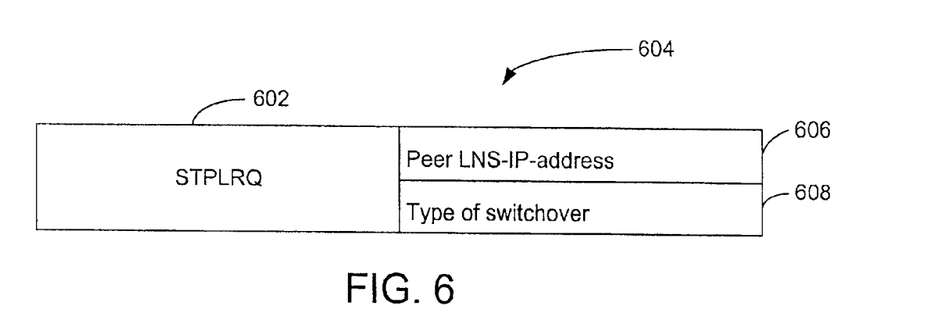
FIG. 6 is a preferred device and method for notifying the access concentrator to perform a switchover in accordance with a preferred embodiment of the present invention.

Referring now to FIG. 6, one example of a STPLRQ message is described. A field 602 indicates the message is a STPLRQ message. An AVP field 604 may include a plurality of AVPs. A peer-LNS-IP-address field 606 contains the IP address of the peer LNS. A type-of-switchover field 608 informs the LAC whether to switch all the sessions to the peer LNS or switch all the new sessions to the peer LNS, or to switch some sessions to the peel LNS. A default value may be included. For example, the default may be to switch all sessions in the tunnel to the peer LNS. The above fields may be integer values. However, other types of values are possible.

Figure 7:
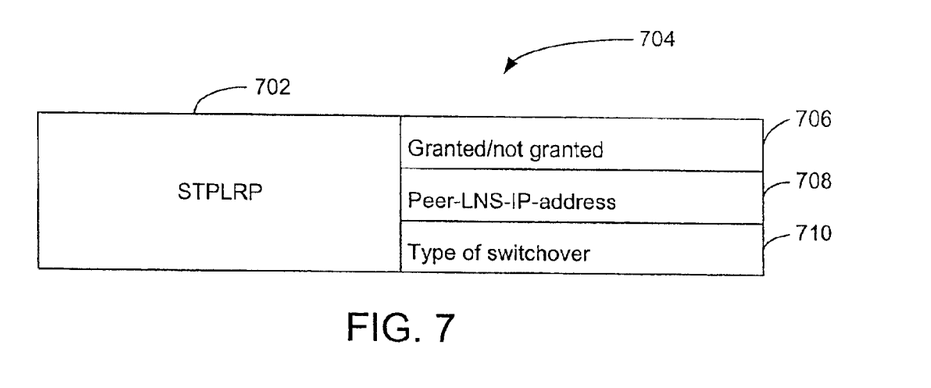
FIG. 7 is a preferred device and method used by an access concentrator to grant or deny a switchover request in accordance with a preferred embodiment of the present invention.

Referring now to FIG. 7, a STPLRP message is described. An op-code field 702 indicates the message is a STPLRP message. An AVP field 704 may include a plurality of AVPs. An action field 706 indicates whether the STPLRQ message (to which the STPLRP is in response) has been granted or denied. A peer-LNS-IP-address field 708 contains the IP address of the peer LNS. A type-of-switchover field 710 informs the LAC whether to switch fill the sessions to the peer LNS or switch all the new sessions to the peer LNS, or to switch some sessions to the peer LNS. A default value may be included. For example, the default may be to switch all sessions in the tunnel to the peer LNS. The fields 708 and 710 serve to identify the STPLRP message being responded to by the STPLRP message. The above fields may be integer values. However, other types of values are possible.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

It will be apparent to those of ordinary skill in the art that methods and system described herein may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A method of load-balancing a network comprising the steps of:

establishing a primary L2TP Network Sever (LNS), a peer LNS and a L2TP Access Concentrator (LAC), wherein said primary LNS includes state information;

coupling the primary LNS, the peer LNS, and the LAC to a network;

transmitting first information from a CPE to said LAC;

establishing a first tunnel between said LAC and said primary LNS and transmitting said first information through said tunnel;

comparing an LNS overload parameter to an LNS overload threshold and responsively determining that said primary LNS is overloaded if said LNS overload parameter exceeds said LNS overload threshold;

offloading said state information directly from said primary LNS to said peer LNS via said network;

in response to determining that said primary LNS is overloaded, establishing a second tunnel from said LAC to said peer LNS using said state information; and transmitting second information from said CPE to said LAC and through said second tunnel.

2. The method of claim 1, further comprising the step of:
requesting a switchover from said primary LNS to said peer LNS.

3. The method of claim 1 comprising the further step of:
detecting whether the primary LNS is inoperative.

4. A method of providing high availability in a network comprising the steps of:

establishing a primary L2TP Network Server (LNS), a peer LNS and a L2TP Access Concentrator (LAC), said primary LNS including state information;

coupling the primary LNS and the peer LNS to a network;

transmitting first information from a CPE to said LAC;

establishing a first tunnel between said LAC and said primary LNS and transmitting said first information through said first tunnel via one or more communication sessions;

comparing an LNS overload parameter to an LNS overload threshold and responsively determining that said primary LNS is overloaded if said LNS overload parameter exceeds said LNS overload threshold;

directly offloading state information from said primary LNS to said peer LNS;

in response to said determining step, (i) establishing a second tunnel from said CPE to said peer LNS using said state information, and (ii) performing a switchover of some of said one or more communication sessions to said peer LNS;

transmitting second information from said CPE to said LAC; and transmitting said second information through said second tunnel via said some of said one or more communication sessions.

5. A system for achieving load balancing comprising:
a first network;
a L2TP Access Concentrator (LAC), coupled to said first network;
a primary L2TP Network Server (LNS), said primary LNS including state information and a peer LNS, said primary LNS and said peer LNS being coupled to said first network; and
a CPE coupled to said LAC;
wherein said primary LNS transfers state information directly to said peer LNS;
wherein said primary LNS and said LAC establish one or more communication sessions between said primary LNS and said LAC, wherein said primary LNS detects that said primary LNS is overloaded, and responsively sends said LAC a request to switchover to said peer LNS, and wherein said request directs said LAC to switch some of said one or more communication sessions between said primary LNS and said LAC to between said peer LNS and said LAC.

6. The system of claim 5 wherein said primary LNS sends a switchover request to said LAC.

7. The system of claim 6 wherein said LAC sends a switchover reply in response to receiving said switchover request.

8. The system of claim 5 wherein said LAC determines whether said primary LNS is operative.

9. A system comprising:
a primary L2TP Network Server (LNS), said primary LNS including (i) state information, (ii) an LNS overload parameter, (iii) an LNS overload threshold, and (iv) program code for comparing said LNS overload parameter to said LNS overload threshold and for detecting that said primary LNS is overloaded if said LNS overload parameter exceeds said LNS overload threshold;

a peer LNS;

a network, said primary LNS and said peer LNS coupled to said network;

means for offloading said state information directly from said primary LNS to said peer LNS;

means for requesting a switchover of communication sessions to said peer LNS if said primary LNS is overloaded, wherein said communication sessions are sessions selected from the group consisting of (i) new communication sessions, (ii) existing communication sessions to said primary LNS, and (iii) new communication sessions and existing communication sessions to said primary LNS; and means for switching over said communication sessions.

10. A system comprising:
a access concentrator;
a primary network server, said primary network server having associated state information;
a peer network server; and
a network coupled to said primary network server, said access concentrator, and said peer network server,
wherein said primary network server directly downloads state information to said peer network server,
wherein said primary network server and said access concentrator establish a first set of communication sessions between said primary network server and said access concentrator,
wherein said primary network server detects that said primary network server is overloaded and responsively requests said access concentrator to switchover some of the first set of communication sessions to the peer network server, and thereafter said access concentrator responsively switches some of the first set of communication sessions to said peer network server, and
wherein said access concentrator uses said state information to switch said some of the first set of communication sessions.

11. The system of claim 10 wherein said primary network server requests the access concentrator that said peer network server become activated.

12. The system of claim 11 wherein said access concentrator determines whether said primary network server is inoperative.

13. The system of claim 10 further comprising CPE, wherein said CPE is coupled to said access concentrator.

14. The system of claim 10 further including a first tunnel between said access concentrator and said primary server, said tunnel carrying information.

15. The method of claim 1,
wherein said LNS overload parameter is a parameter selected from the group consisting of (i) a number of LNS connections, (ii) a CPU usage value, and (iii) a memory usage value,
wherein (i) if said LNS overload parameter is said number of LNS connections, then said LNS overload threshold is a number of LNS connections that indicates said primary LNS is overloaded, (ii) if said LNS overload parameter is said CPU usage value, then said LNS overload threshold is a CPU usage value that indicates said primary LNS is overloaded, and (iii) if said LNS overload parameter is said memory usage value, then said LNS overload threshold is a memory usage value that indicates said primary LNS is overloaded.

16. The method of claim 2, wherein said switchover involves switching all sessions selected from the group of: (i) new sessions, (ii) some sessions, and (iii) all sessions.

17. The method of claim 4, wherein said second set of communication sessions includes sessions selected from the group consisting of: (i) new sessions, (ii) some of the first set of communication sessions, and (iii) new sessions and the first set of communication sessions.

18. The method of claim 4, further comprising:
buffering said second information in said LAC until said second tunnel is established and said switchover is performed.

19. The system of claim 5, wherein said request further directs said LAC to switch new communication sessions directed towards said primary LNS to said peer LNS.

20. The method of claim 9,
wherein said LNS overload parameter is a parameter selected from the group consisting of (i) a number of LNS connections, (ii) a CPU usage value, and (iii) a memory usage value,
wherein (i) if said LNS overload parameter is said number of LNS connections, then said LNS overload threshold is a number of LNS connections that indicates said primary LNS is overloaded, (ii) if said LNS overload parameter is said CPU usage value, then said LNS overload threshold is a CPU usage value that indicates said primary LNS is overloaded, and (iii) if said LNS overload parameter is said memory usage value, then said LNS overload threshold is a memory usage value that indicates said primary LNS is overloaded.

* * * * *

UNITED STATES PATENT AND TRADEMARK OFFICE
CERTIFICATE OF CORRECTION

PATENT NO. : 6,917,592 B1
DATED : July 12, 2005
INVENTOR(S) : Rajesh Ramankutty et al.

It is certified that error appears in the above-identified patent and that said Letters Patent is hereby corrected as shown below:

<u>Title page,</u>
Item [75], Inventors, change "Sanil Kumar Puthiyandiyil" to -- Sanil Kumar Puthiyandyil --.

Signed and Sealed this

Twentieth Day of September, 2005

JON W. DUDAS
*Director of the United States Patent and Trademark Office*